(12) United States Patent
Herman et al.

(10) Patent No.: US 9,353,742 B2
(45) Date of Patent: May 31, 2016

(54) CHECK VALVE

(71) Applicant: Curtis Roys, Kingsland, TX (US)

(72) Inventors: Rodney Herman, Austin, TX (US);
Raymond J Hengel, Jr., Round Rock, TX (US); Curtis Roys, Kingsland, TX (US)

(73) Assignee: Curtis Roys, Fredericksburg, TX (US)

( * ) Notice: Subject to any disclaimer, the term of this patent is extended or adjusted under 35 U.S.C. 154(b) by 29 days.

(21) Appl. No.: 14/504,230

(22) Filed: Oct. 1, 2014

(65) Prior Publication Data
US 2016/0040663 A1 Feb. 11, 2016

(51) Int. Cl.
| | |
|---|---|
| *F16K 15/00* | (2006.01) |
| *F04B 53/10* | (2006.01) |
| *F16K 15/04* | (2006.01) |
| *F16K 17/20* | (2006.01) |
| *F16N 21/00* | (2006.01) |

(52) U.S. Cl.
CPC ........... *F04B 53/1002* (2013.01); *F16K 15/042* (2013.01); *F16K 15/044* (2013.01); *F16K 17/20* (2013.01); *F16N 21/00* (2013.01); *Y10T 137/7838* (2015.04)

(58) Field of Classification Search
CPC ............ Y10T 37/7838; Y10T 37/7854; Y10T 37/87499; Y10T 37/88062; Y10T 37/88054; F16N 21/00; F16N 21/02
USPC ............................................ 184/105.2, 105.3
See application file for complete search history.

(56) References Cited

U.S. PATENT DOCUMENTS

| | | | |
|---|---|---|---|
| 302,343 A | 7/1884 | Kitton |
| 339,251 A | 4/1886 | Ames |
| 942,995 A | 12/1909 | Bargar |
| 1,002,463 A | 9/1911 | Spellmeyer |
| 1,112,631 A | 10/1914 | Longtin |
| 1,201,414 A | 10/1916 | Winkley |
| 1,234,878 A | 7/1917 | Corvin |
| 1,343,677 A | 6/1920 | Langmack |
| 1,512,597 A | 10/1924 | Harmon |
| 1,524,257 A | 1/1925 | Kensig |
| 1,534,173 A | 4/1925 | Fogelberg |
| 1,632,775 A | 6/1927 | Bijur |
| 1,633,056 A | 6/1927 | Wishart et al. |
| 1,640,600 A | 8/1927 | Crosby |
| 1,664,733 A | 4/1928 | Braun |

(Continued)

FOREIGN PATENT DOCUMENTS

GB 2117662 10/1983

OTHER PUBLICATIONS

Ariel Corporation, "Double Throttle Check Valve Sandwich Plate," Webpage, [http://www.arielcorp.com/ext_data/vendor_literature/rotary/HYTOS_Check_Valve1989.pdf], Accessed Nov. 19, 2015, 2 pages.

(Continued)

*Primary Examiner* — R. K. Arundale
(74) *Attorney, Agent, or Firm* — Michael O. Scheinberg; Scheinberg & Associates

(57) ABSTRACT

A check valve includes an internal liquid trap that prevents the backflow of gas and debris from degrading the valve. The internal liquid trap can be formed by internal passages within a valve housing. One embodiment includes a plurality of concentric fluid passages, connected by a set of radial conduits.

20 Claims, 9 Drawing Sheets

(56) References Cited

U.S. PATENT DOCUMENTS

| | | | |
|---|---|---|---|
| 1,734,292 A | 11/1929 | Gonzalez | |
| 1,770,683 A | 7/1930 | Kenneth | |
| 1,940,452 A | 12/1933 | Glab | |
| 1,946,339 A | 2/1934 | Wigers et al. | |
| 1,949,639 A | 3/1934 | Zimmerer | |
| 2,048,323 A | 7/1936 | Cutts | |
| 2,056,133 A * | 9/1936 | Corey | F16N 23/00 137/454.5 |
| 2,202,211 A | 5/1940 | Klingr | |
| 2,241,718 A | 5/1941 | Meixsell | |
| 2,306,012 A | 12/1942 | Campbell | |
| 2,531,319 A | 11/1950 | Briggs | |
| 2,554,481 A | 5/1951 | Sheen et al. | |
| 2,724,555 A | 11/1955 | Proetter | |
| 2,809,659 A | 10/1957 | Gillespie et al. | |
| 2,845,945 A | 8/1958 | Mancusi | |
| 3,202,178 A | 8/1965 | Wolfe | |
| 3,292,498 A | 12/1966 | Zimmerman | |
| 3,371,745 A | 3/1968 | Callahan et al. | |
| 3,409,104 A | 11/1968 | Acker et al. | |
| 3,491,788 A | 1/1970 | Kilayko | |
| 3,491,795 A | 1/1970 | Jennings et al. | |
| 3,656,584 A | 4/1972 | Lyden | |
| 3,769,999 A | 11/1973 | Flanagan et al. | |
| 3,834,124 A | 9/1974 | Ichikawa | |
| 3,923,435 A | 12/1975 | Jones | |
| 4,671,915 A | 6/1987 | Fujimoto et al. | |
| 4,862,911 A | 9/1989 | Yie | |
| 4,977,927 A * | 12/1990 | Hill | F16K 15/044 137/539 |
| 5,025,762 A | 6/1991 | Gohara et al. | |
| D321,928 S | 11/1991 | Milo | |
| D339,399 S | 9/1993 | Lin | |
| D364,210 S | 11/1995 | Loerop et al. | |
| 5,490,874 A | 2/1996 | Kuster et al. | |
| D370,963 S | 6/1996 | Daansen | |
| 5,662,023 A | 9/1997 | Carson et al. | |
| 5,698,117 A | 12/1997 | Doutt | |
| 5,835,372 A | 11/1998 | Roys et al. | |
| 6,021,805 A | 2/2000 | Horne et al. | |
| D426,617 S | 6/2000 | Hansen | |
| 6,247,487 B1 | 6/2001 | Skill | |
| 6,467,854 B2 | 10/2002 | Frank et al. | |
| 6,779,558 B1 | 8/2004 | Bruck et al. | |
| D496,091 S | 9/2004 | Katzman et al. | |
| 6,893,485 B2 | 5/2005 | MacDuff | |
| D576,704 S | 9/2008 | Gilcher | |
| 7,434,593 B2 | 10/2008 | Noll et al. | |
| 7,458,388 B2 | 12/2008 | Huang | |
| 7,806,142 B2 | 10/2010 | Baros et al. | |
| 7,905,557 B2 | 3/2011 | Frank et al. | |
| 7,931,126 B2 * | 4/2011 | Croci | F16N 21/02 137/540 |
| 8,555,927 B2 | 10/2013 | Roys | |
| 8,622,082 B1 | 1/2014 | Roys | |
| 8,770,543 B2 | 7/2014 | Huynh | |
| 8,807,170 B2 | 8/2014 | Klaphake et al. | |
| 8,899,279 B2 | 12/2014 | Safronovs | |
| 8,939,176 B2 | 1/2015 | Klaphake et al. | |
| 2003/0111115 A1 | 6/2003 | Schultz et al. | |
| 2005/0115614 A1 | 6/2005 | Einhaus | |
| 2010/0163775 A1 * | 7/2010 | Kim | F16K 1/12 251/357 |
| 2014/0000983 A1 | 1/2014 | Roys | |

OTHER PUBLICATIONS

Aerial Corporation, "Double Throttle Check Valve Sandwich Plate," Webpage, [http://www.arielcorp.com/ext_data/vendor_literature/rotary/HYTOS_Check_Valve1989.pdf], Accessed Nov. 19, 2015, 2 pages.

Sloan Brothers Company, "Omni Air Trap: Part #SB-OT-1/4 SB-OT-1/8," WebSite, [www.sbco.com], Accessed Nov. 19, 2015, 1 page.

Hopkins, Ellen, "New Divider Block Lube-System Check Valve and Check Valve Protector," CompressorTech, Mar. 2006, 3 pages.

CPI Lubrication Group, "XDC—Extreme Duty Check Valve and CVP Check Valve Protector", www.enproindustries.com, Accessed Jan. 2014.

* cited by examiner

CHECK VALVE

TECHNICAL FIELD OF THE INVENTION

The present invention relates to extending the life of check valves in hostile environments, and is particularly suitable for use in lubrication systems for natural gas compressors.

BACKGROUND OF THE INVENTION

Natural gas compressors require a consistent supply of lubricant. To enter the compressor, the lubricant must be delivered at a pressure that is greater than the pressure within the compressor. Lubricant is typically distributed to the lubrication points by a divider block, which periodically delivers a small amount of lubricant at a high pressure to each lubrication point. A check valve is used to prevent hot gases from the compressor cylinder from flowing into the lubrication system when the pressure from the lubrication system is reduced, such as between cycles of the divider block. When the lubricant pressure is sufficiently high, the check valve opens and lubricant is injected into the compressor cylinder. When the lubricant pressure is reduced, the spring closes the valve to prevent gases from the compressor cylinder from entering the lubrication system.

Prior art check valves fail due to hot gas and debris entering the check valve each time the pump causes it to open to allow lubricant to be injected into the compressor cylinder or rod packing gland. This exposes the seating surfaces to the hot gas and debris that are in the gas stream of the compressor. The hot gas heats the sealing surfaces in the check valve causing it to fail prematurely. The debris in the gas stream migrates into the check valve and causes the balls to stick open. As the debris lodges between the sealing surface and the ball, the hot gas migrates upstream into the lubricant tubing and causes problems with the pistons that inject oil into the cylinder or rod packing gland.

One known solution is a separate device, a check valve protector, installed on the downstream side of the check valve to protect the sealing surfaces. This adds extra cost to the components and adds another lubricant leak path to the system. Another disadvantage of current check valve protectors is the positioning of the lubricant inlet. The inlet is oriented at a 90 degree position from the check valve protector axis, which prevents the check valve protector from being installed in many applications where the cylinder is close to another cylinder. Another problem with prior art check valve protectors is they incorporate a single NPT thread on the outlet. This causes installation issues when installing the device. Due to the 90 degree inlet of this device, in many cases it must be over torqued to position it correctly to align with the system tubing connection. This causes extreme stress on the threads in the compressor cylinder and has been known to destroy both the cylinder threads and the threads on the device. The over torqueing of the threads deforms the metal and not only causes issues with leaking explosive gases to the atmosphere, but also eliminates the ability to reuse that particular injection point if a new device has to be installed. When this occurs the compressor cylinder must be removed and sent to a machine shop to be repaired or a new cylinder must be installed, which costs the owner/operator thousands of dollars.

SUMMARY OF THE INVENTION

An object of the invention is to provide a more reliable check valve.

A check valve includes an internal fluid trap that prevents gas from the output path from passing through the check valve and degrading the sealing surfaces. When used with a natural gas compressor lubrication system, the internal fluid trap prevents hot gases and debris from the compressor interior from degrading the sealing surface within the check valve. Some embodiments include more than one fluid reservoir.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

A preferred check valve includes an internal liquid trap between the sealing components and the outlet to prevent backflow from the outlet from deteriorating the sealing components. In a natural compressor lubrication system, a preferred check valve includes an internal oil trap between the sealing components and the outlet to prevent backflow of hot gases and debris from the compressor. In the description below, the terms "top" and "bottom" are used in relation to the figures.

Figure 1:
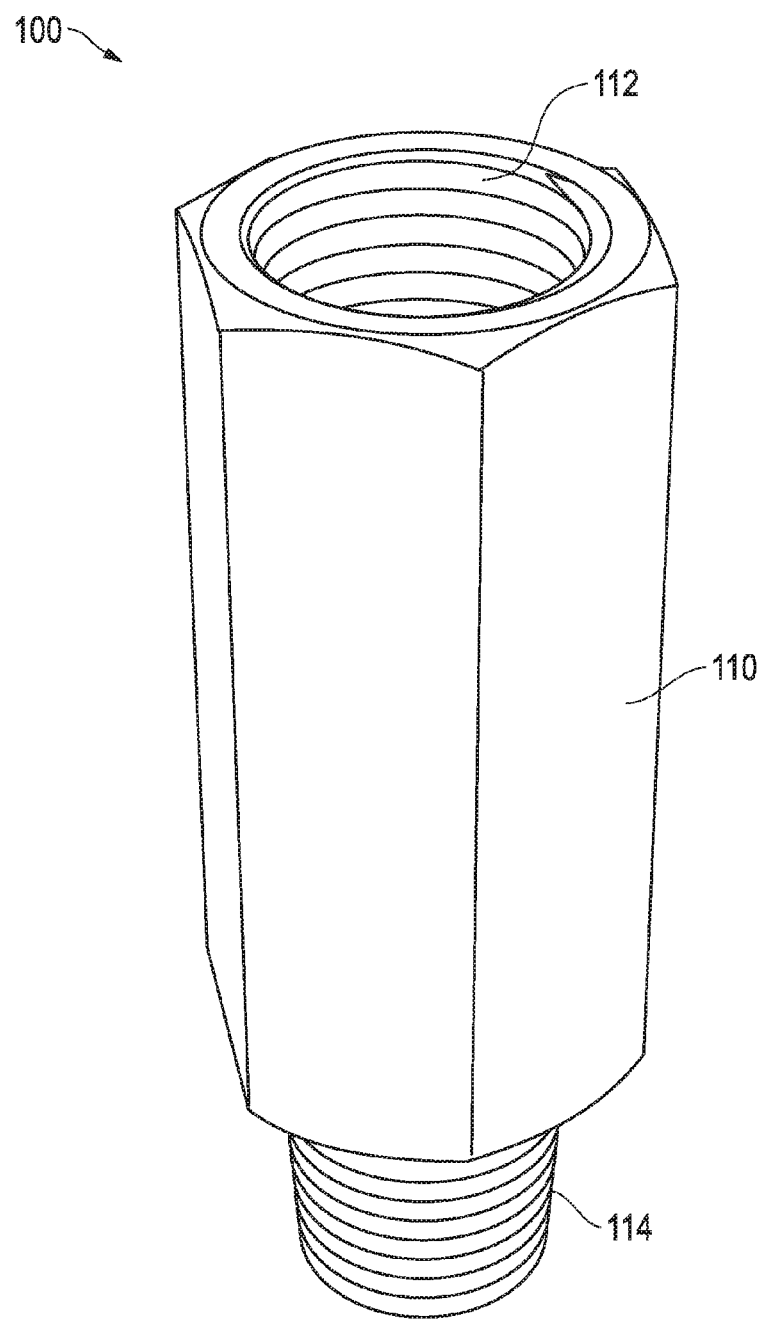
FIG. 1 is a perspective view of a check valve that is shown in accordance with an illustrative embodiment.

Referring now to FIG. 1, a perspective view of a check valve is shown according to an illustrative embodiment. Check valve 100 comprises valve body 110. Valve body 110 can be constructed from a solid piece of metal, such as stainless steel. The material chosen will depend on the application, but for use in a natural gas compressor lubrication system, the material should be resistant to corrosion by the gases and debris in the compressor.

Figure 2:
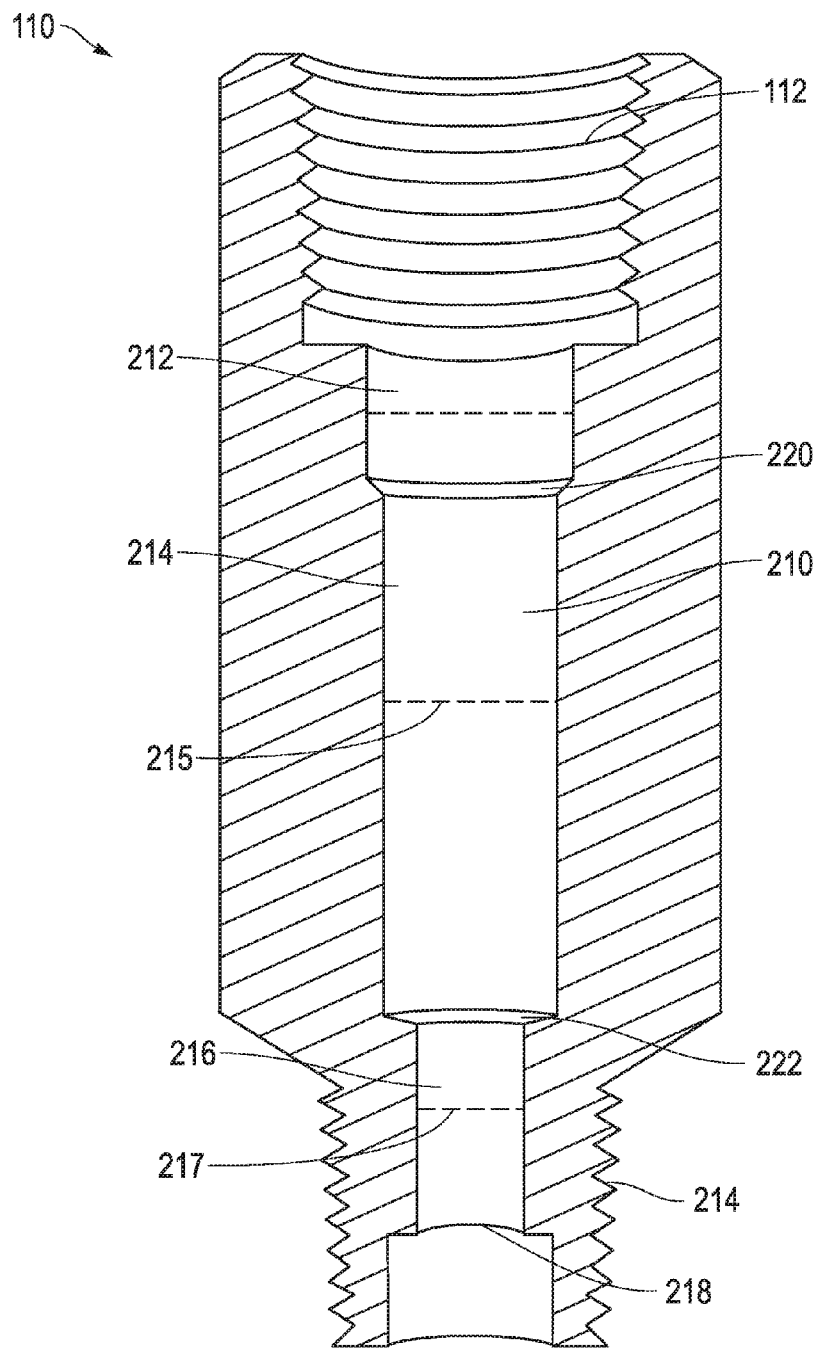
FIG. 2 is a cross sectional view of a valve body that is shown in accordance with an illustrative embodiment.

A cavity 112 having female pipe threads is formed at a first end of valve body 110. Cavity 112 can be adapted to attach check valve 102 a fluid reservoir, such as a source of lubricating oil, by female pipe threads. Distal from the cavity 112, valve stem 114 having male pipe threads is formed at a second end of valve body 110. By using male pipe threads, valve stem 114 can be adapted to attach check valve 100 to machinery or equipment to which fluid is to be provided Referring now to FIG. 2, a cross sectional view of valve body 110 is shown in accordance with an illustrative embodiment. Valve body 110 includes axial conduit 210 extending longitudinally through the center thereof, connecting cavity 112 to valve stem 114.

According to an illustrative embodiment, axial conduit 210 is comprised of a plurality of sections, each section having a different diameter. Section 212 has a diameter 213. Section 214 has a diameter 215. Section 216 has a diameter 217. Shoulder 218 is formed within the conduit to engage anti-blowout screw 600, described in FIG. 6 below.

Seat 220 transitions section 212 to section 214. Seat 220 is a ridge within axial conduit 210 that forms a step down from diameter 213 to diameter 215. Seat 222 transitions section 214 to section 216. Seat 222 is a ridge within axial conduit 210 that forms a step down from diameter 215 to diameter 217.

Figure 3:
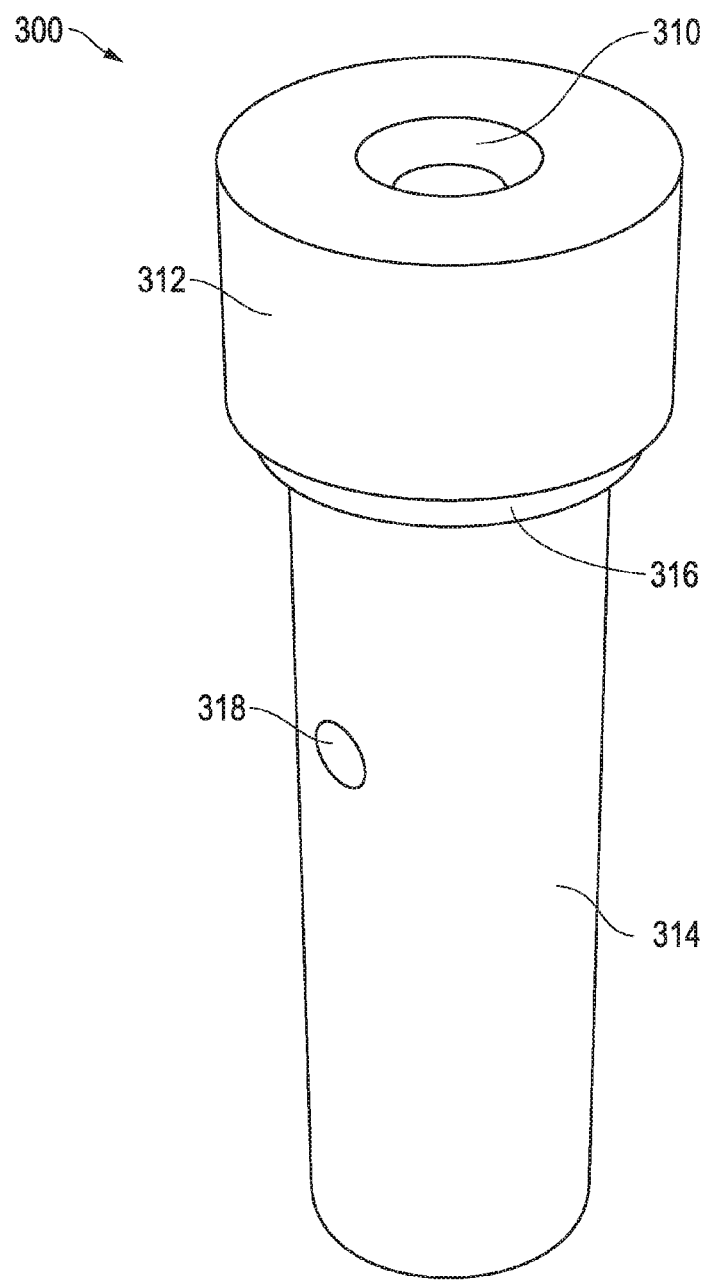
FIG. 3 is a perspective view of a valve inner housing that is shown in accordance with an illustrative embodiment.

Referring now to FIG. 3, a perspective view of a valve inner housing is shown in accordance with an illustrative embodiment. Valve inner housing 300 is adapted to be positioned within axial conduit 210.

Figure 4:
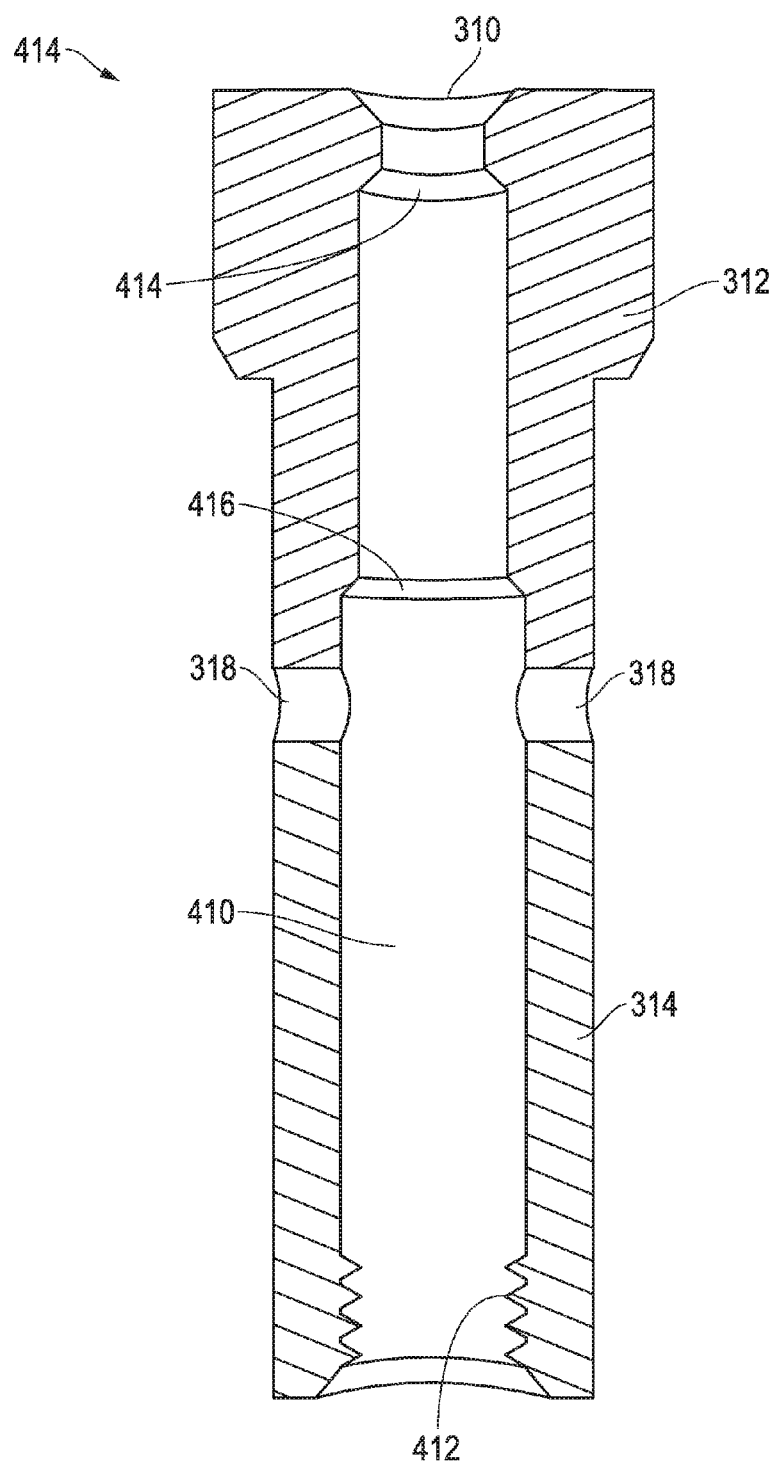
FIG. 4 is a cross-sectional view of a valve inner housing shown according to an illustrative embodiment.

Valve inner housing 300 includes an inlet port 310 allowing for fluid ingress through head 312 into inner conduit 410, shown in FIG. 4. Head 312 connects with annular inner body 314 at taper 316. Annular inner body 314 is adapted to be received within axial conduit 210 of valve body 110.

Valve inner housing 300 includes a set of radial conduits 318. As used herein, a set can include one or more radial conduits. Radial conduits 318 allow fluids passage from inner conduit 410, shown in FIG. 4, to the exterior of annular inner body 314.

Referring now to FIG. 4, a cross-sectional view of valve inner housing 300 is shown according to an illustrative embodiment.

Inlet port 310 allows fluid to flow into inner conduit 410. Inner conduit 410 extends longitudinally through valve inner housing 300. According to an illustrative embodiment, inner conduits 410 is includes threaded female section 412 distal from inlet port 310. Female threaded section 412 allows valve inner housing 300 to connect to anti-blowout screw 600, shown in FIG. 6.

According to an illustrative embodiment, inner conduit 410 is comprised of a plurality of sections, each section having a different diameter corresponding to a ball utilized for that section of the valve. The corresponding balls were used in each section of the check valve inner housing 300 is shown in FIG. 5.

Figure 5:
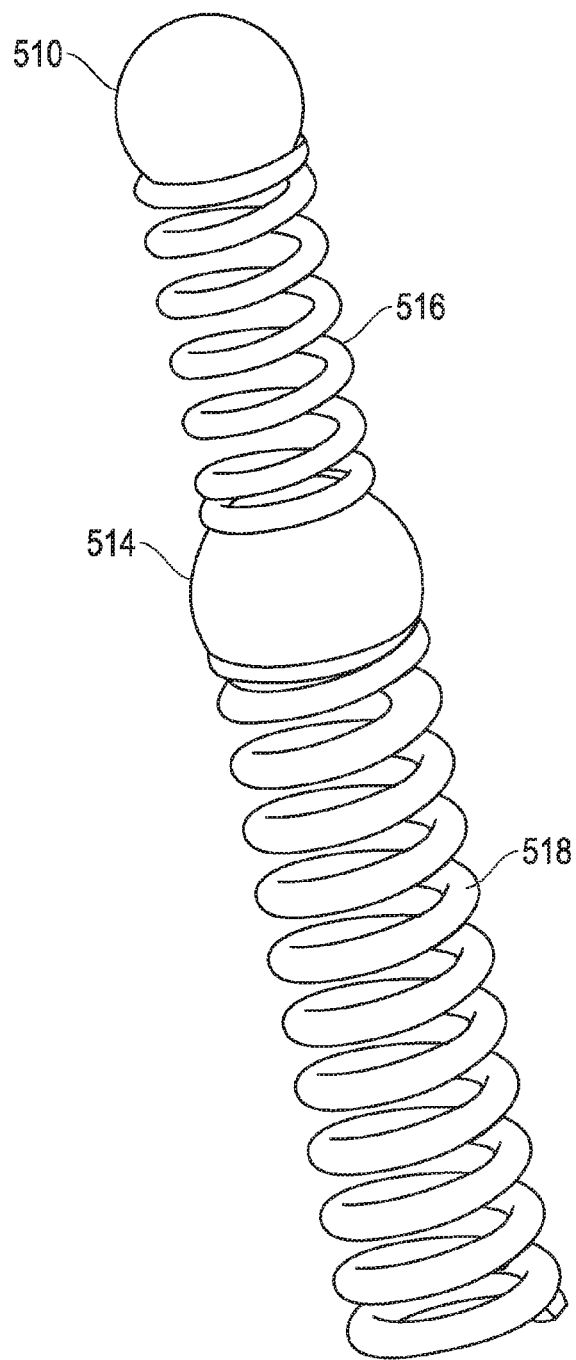
FIG. 5 is a set of sealing ball and bias springs for use in a check valve shown according to an illustrative embodiment.

Seat 414 is an interior surface of inner conduit 410 which contacts the ball 510, shown in FIG. 5, to form a leak-tight seat. Seat 416 is an interior surface of inner conduit 410 which contacts the ball 510, shown in FIG. 5, to form a leak-tight seal.

Radial conduits 318 allow fluids passage from inner conduit 410, shown in FIG. 4, to the exterior of annular inner body 314. Radial conduits 318 extend transversely across inner conduit 410. According to an illustrative embodiment, radial conduits 318 are formed beneath seat 416.

Referring now to FIG. 5, a set of sealing balls and biasing springs are shown according to an illustrative embodiment.

Ball 510 is adapted to be positioned within inner conduit 410. When check valve 100 is closed, ball 510 is positioned against seat 414 to form a seal, preventing fluid exchange between inlet port 310 and inner conduit 410. Spring 512 provides a bias to ball 510. Spring 512 is adapted to be positioned within inner conduit 410, biasing ball 510 against seat 414.

Ball 514 is adapted to be positioned within inner conduit 410. When check valve 100 is closed, ball 514 is positioned against seat 416 to form a seal, preventing fluid exchange between inner conduit 410 and axial conduits 318. Spring 516 provides a bias to ball 514. Spring 516 is adapted to be positioned within inner conduit 410, biasing ball 514 against seat 416.

Figure 6:
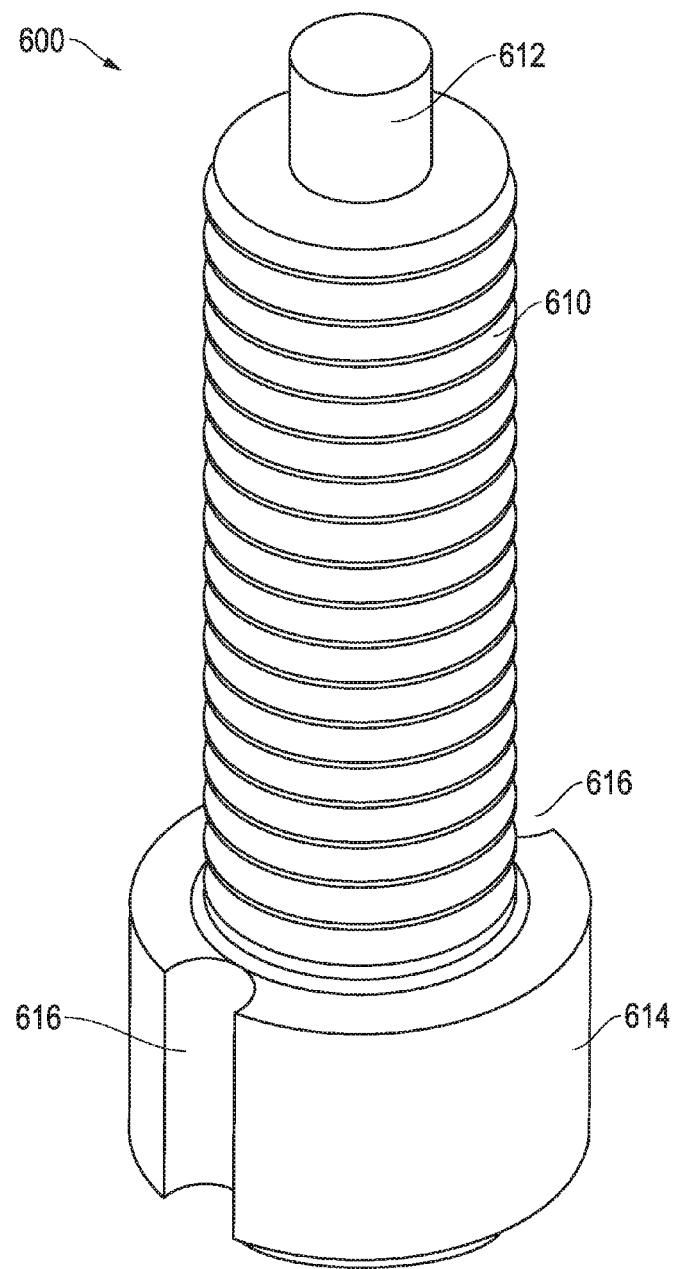
FIG. 6 is an anti-blowout screw for use in a check valve shown according to an illustrative embodiment.

Referring now to FIG. 6, an anti-blowout screw is shown according to an illustrative embodiment. When assembled, anti-blowout screw 600 is adapted to slide through section 216 of the valve body 110 and engage female threaded section 412 of valve inner housing 300.

Anti-blowout screw 600 includes male threaded portion 610. Male threaded portion 610 preferably slidably engages valve body 110 through section 216. Male threaded portion 610 can then engage female threaded section 412 of inner valve inner housing 300.

In an illustrative embodiment, anti-blowout screw 600 includes spring supports 612. Spring supports 612 is a cylindrical protrusion extending axially from anti-blowout screw 600. Spring supports 612 is adapted to engage spring 516 within inner conduit 410 of the assembled check valve 100.

Anti-blowout screw 600 includes screw head 614. Screw head 614 is adapted to engage and substantially abut shoulder 218 of valve body 110.

Anti-blowout screw 600 includes set of fluid output grooves 616. Fluid output grooves 616 allow fluid to escape from check valve 100 despite a seal between screw head 614 and shoulder 218 of valve body 110. In one illustrative embodiment, fluid output grooves 616 are arcuate incursions into screw head 614 that are substantially parallel with a central axis of anti-blowout through 600.

Figure 7:
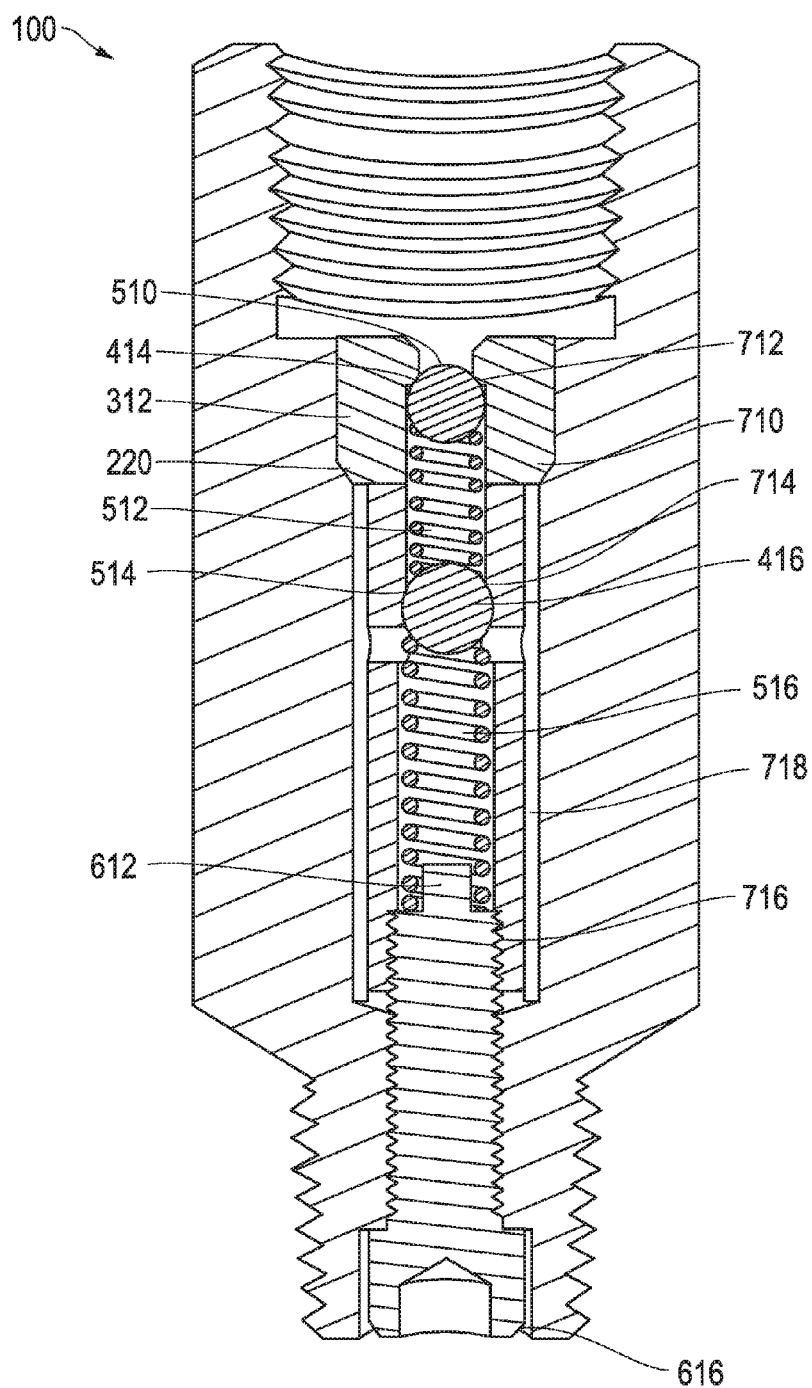
FIG. 7 is a cross-sectional view of a check valve according to an illustrative embodiment shown in a closed position.

Referring now to FIG. 7, a cross sectional view of check valve 100 is shown in a closed position according to an illustrative embodiment. Check of 100 includes the assembled pieces of valve body 110, valve inner housing 300, and anti-blowout screw 600, as well as sealing balls 510, 514 and biasing springs 512, 516.

Head 312 of valve inner housing 300 is adapted to sit within section 212 of the valve body 110. Head 312 engages seat 220 of valve inner housing 300 at interface 710. Annular inner body 314 extends concentrically along section 214 of valve body 110. Annular inner body 314 has a diameter that is less than diameter 215, such that annular oil jacket 718 is formed between the outer surface of annular inner body 314 and the inner surface of axial conduit 210 along section 214.

Ball 510 is adapted to be positioned within inner conduit 410. When check valve 100 is closed, ball 510 is positioned against seat 414 at interface 712 to form a seal, preventing fluid exchange between inlet port 310 and inner conduit 410. Spring 512 provides a bias to ball 510. Spring 512 is adapted to be positioned within inner conduit 410, biasing ball 510 against seat 414.

Ball 514 is adapted to be positioned within inner conduit 410. When check valve 100 is closed, ball 514 is positioned against seat 416 to form a seal, preventing fluid exchange between inner conduit 410 and axial conduits 318. Spring 516 provides a bias to ball 514. Spring 516 is adapted to be positioned within inner conduit 410, biasing ball 514 against seat 416. Spring 516 is positioned within inner conduit 410 through engagement with spring supports 612.

Male threaded portion 610 of anti-blowout screw 600 mates with female threaded section 412 of valve inner housing 300 to form a leak-tight seal at interface 716.

When a fluid source applies sufficient pressure to the check valve 100 at inlet port 310, spring 512 and spring 516 are compressed. Both ball 510 and ball 514 are moved distally away from the inlet port 310, allowing the fluid to flow through inlet port 310 and into inner conduit 410. Inner conduit 410 is block at interface 716 by anti-blowout screw 600. Fluid therefore moves from inner conduit for the 10 through radial conduits 318 and into annular oil jacket 718 between the outer surface of annular inner body 314 and the inner surface of axial conduit 210.

Fluid from annular oil jacket 718 is therefore allowed to flow annularly around anti-blowout screw 600 through section 216 of axial conduit 210. Fluid can then flow through fluid output grooves 616, and into machinery or equipment to which fluid is to be provided. The release of fluid into any machinery or equipment decreases pressure within check valve 100. Spring 512 and Spring 516 can restore ball 510 and 514 to their seated positions against seat 414 and seat 416 respectively.

Figure 8:
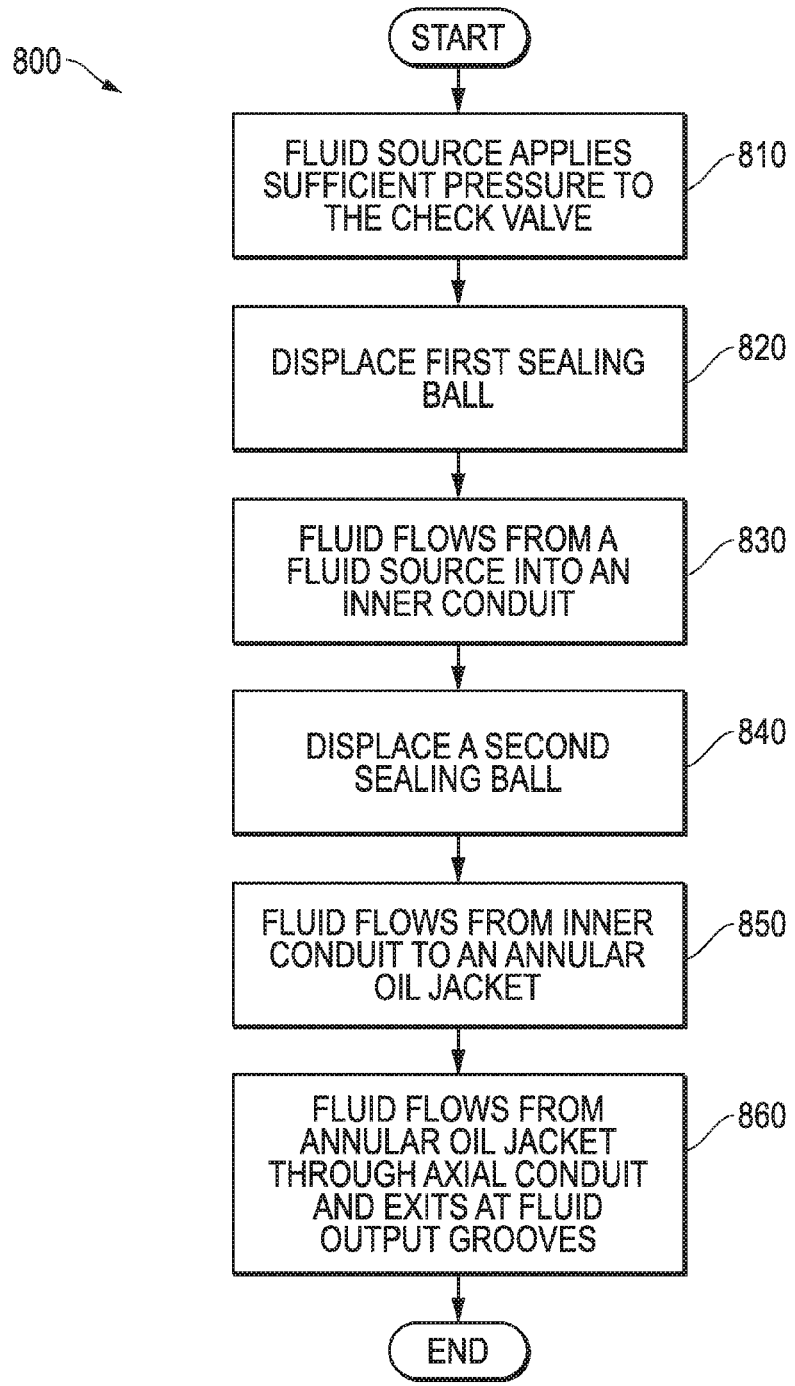
FIG. 8 is a flowchart of a process for supplying fluid to a machinery or equipment from a fluid reservoir using a check valve according to an illustrative embodiment.

Referring now to FIG. 8, a flowchart showing the process steps of supplying a fluid to a machinery or equipment from a fluid reservoir utilizing a check valve according to an illustrative embodiment is shown. Process 800 is a mechanical process illustrating movement of a fluid through a check valve, such as check of 100 of FIG. 1.

Process 800 begins when a fluid source applies sufficient pressure to the check valve (step 810). Pressure applied from this fluid source causes a first valve to open by displacing a first sealing ball (step 820). The sealing ball can be, for example ball 510 of FIG. 5. When the sealing ball is displaced, fluid flows from the fluid source into an inner conduit (step 830). The inner conduit can be, for example inner conduit 410 of FIG. 4.

Pressure within the inner conduit displaces a second sealing ball (step 840). The second sealing ball can be, for example ball 514 of FIG. 5. Fluid then flows from the inner conduit to an annular oil jacket (step 850). The annular oil jacket can be, for example annular oil jacket 718 of FIG. 7. The fluid flows from the inner conduit to the annular oil jacket via a set of radial conduits, such as radial conduits 318 of FIG. 4.

Fluid flows from the annular oil jacket through an axial conduit and exits the check valve through a set of fluid output grooves (step 860). According to an illustrative embodiment, the fluid can exit the check valve by flowing annularly around an anti-blowout screw, such as anti-blowout screw 600 through section 216 of axial conduit 210, and through fluid output grooves 616, such as fluid output grooves 616.

Figure 9:
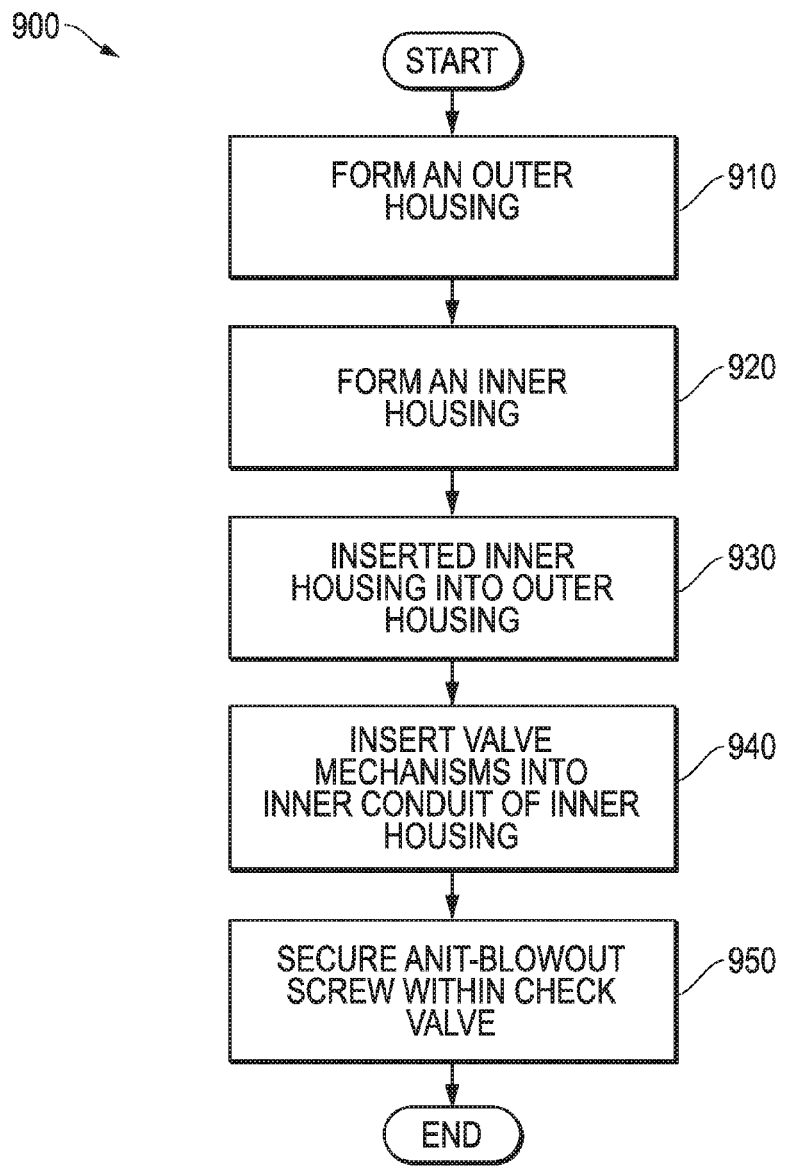
FIG. 9 is a flowchart of a process for manufacturing a check valve shown according to an illustrative embodiment.

Referring now to FIG. 9, a flowchart of a process for manufacturing a check valve is shown according to an illustrative embodiment. Process 900 can be utilized to manufacture a check valve such as check valve 100 of FIG. 1.

Process 900 begins by forming an outer housing (step 910). The outer housing can be, for example outer housing 110.

Process 900 then forms an inner housing (step 920). The inner housing can be, for example, inner housing 300.

Inner housing is then inserted into the outer housing (step 930). In an illustrative embodiment, the inner housing can be secured within the outer housing using mechanical process, such as for example, press fitting inner housing within outer housing.

Valve mechanisms are then inserted into the inner conduit of inner housing (step 940). The valve mechanism can include, for example, a set of balls and springs within the inner conduit of the inner housing.

An anti-blowout screw is in secured within the check valve (step 950). The anti-blowout screw can further secure the inner housing within the outer housing, and also provide an annular flow path for fluid to exit the check valve.

Illustrative Embodiments described herein provide an oil reservoir above the internal components which protects the sealing surfaces from hot oil or gas.

Embodiments can ultimately reduce the need to shut down a compressor to change a failed check valve. The cost to shut down a compressor to change a failed check valve can amount to tens of thousands of dollars because when the compressor is shut down all production of gas is halted.

By reducing compressor down time, embodiments reduce pollution because when the compressor is shut down the gas that was being compressed must be flared to the atmosphere which pollutes the earth's atmosphere.

Reducing the quantity of gas that is flared when it is shut down also reduces fines imposed for flaring.

The in-line design enables embodiments to be installed on any compressor or in any place a check valve is needed to prevent backflow of lubricant into a lubricating system.

While the embodiments described above are adapted for use in a natural gas compressor, the invention is not limited to any specific application. A preferred check valve used in a natural gas compressor lubrication system can be used in systems at pressures of 10,000 psi and at high temperatures, and can withstand the chemical environment. While the Figures show the use of ball valves inside the check valve, other types of valve, such as poppet valves can also be used. Embodiments could use any type of internal valve besides those mentioned above, for example, diaphragm valves, swing check valves, or disk valve.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A valve structure comprising:
   a housing body having an outer housing with an axial conduit formed there through, and an inner housing disposed within the axial conduit, the inner housing comprising an inlet port to conduct fluid to an inner conduit of the inner housing;
   an anti-blow out screw positioned within the inner conduit;
   a check valve to restrict fluid flow from the inlet port to the inlet conduit;
   a set of radial conduits extending across the inner housing of the housing body and connecting the inlet conduit to an annular oil jacket disposed annularly between the outer housing and the inner housing;

the annular oil jacket opening to the axial conduit distal from the inlet port, the anti-blow out screw allowing fluid flow from the annular oil jacket into the axial conduit.

2. The valve structure of claim 1, wherein the inlet port is threaded to allow connection to a fluid source.

3. The valve structure of claim 2, wherein the fluid source is a source of lubricating oil.

4. The valve structure of claim 1, wherein the check valve is a ball check valve comprising a first ball disposed within the inlet conduit, the first ball to fluid flow from the inlet port to the inlet conduit.

5. The valve structure of claim 4, wherein the ball check valve further comprises a first spring disposed within the inlet conduit, the first spring loading the first ball against the inlet port.

6. The valve structure of claim 5, wherein the ball check valve further comprises a second ball disposed within the inner conduit, the second ball to fluid flow from inner conduit to the set of radial conduits.

7. The valve structure of claim 6, wherein the ball check valve further comprises a second spring disposed within the inlet conduit and in adjacent communication with the anti-blow out screw, the second ball disposed in adjacent communication with the second spring, the first spring disposed in adjacent communication with the second ball, and the second ball disposed in adjacent communication with the second spring.

8. The valve structure of claim 1, wherein the inner housing further comprises a female threaded portion located proximate to where the annular oil jacket opens to the outlet conduit, the female threaded portion adapted to receive the anti-blow out screw.

9. The valve structure of claim 8, wherein rotatably adjusting the anti-blow out screw compresses a first spring loading the first ball against the inlet port.

10. The valve structure of claim 1, wherein the anti-blow out screw further comprises at least one output groove to allow fluid to flow from the outlet conduit out of the housing body.

11. The valve structure of claim 1, wherein the housing body is threaded proximate to the outlet port to allow connection to an equipment.

12. The valve structure of claim 1, wherein the check valve allows a flow of fluid through the check valve under pressure from the inlet port and prevents a backflow of material from the outlet through the housing body.

13. The valve structure of claim 1, wherein the annular oil jacket forms a liquid trap within the housing body, the liquid trap preventing gas from equipment attached to the axial conduit from degrading the check valve.

14. A method of manufacturing a valve structure comprising:
    forming a housing body having an outer housing with an axial conduit formed there through, and an inner housing disposed within the axial conduit, the inner housing comprising an inlet port to conduct fluid to an inner conduit of the inner housing and a set of radial conduits extending across the inner housing of the housing body and connecting the inlet conduit to an annular oil jacket disposed annularly between the outer housing and the inner housing;
    positioning an anti-blow out screw within the inner conduit; and
    disposing a check valve within the inner conduit to restrict fluid flow from the inlet port to the inlet conduit; wherein the annular oil jacket opens to the axial conduit distal from the inlet port, the anti-blow out screw allows fluid flow from the annular oil jacket into the axial conduit.

15. The method of claim 14, wherein the inlet port is threaded to allow connection to a fluid source.

16. The method of claim 15, wherein the fluid source is a source of lubricating oil.

17. The method of claim 14, wherein the check valve is a ball check valve comprising a first ball disposed within the inlet conduit, the first ball to fluid flow from the inlet port to the inlet conduit.

18. The method of claim 17, wherein the ball check valve further comprises a first spring disposed within the inlet conduit, the first spring loading the first ball against the inlet port.

19. The method of claim 18, wherein the ball check valve further comprises a second ball disposed within the inner conduit, the second ball to fluid flow from inner conduit to the set of radial conduits.

20. The method of claim 19, wherein the ball check valve further comprises a second spring disposed within the inlet conduit and in adjacent communication with the anti-blow out screw, the second ball disposed in adjacent communication with the second spring, the first spring disposed in adjacent communication with the second ball, and the second ball disposed in adjacent communication with the second spring.

* * * * *